(12) United States Patent  (10) Patent No.: US 7,942,070 B2
Ertler                     (45) Date of Patent:     May 17, 2011

(54) FLOW RATE SENSOR

(75) Inventor: Werner Ertler, Neuenrade (DE)

(73) Assignee: VSE Volumentechnik GmbH (DE)

( * ) Notice: Subject to any disclaimer, the term of this patent is extended or adjusted under 35 U.S.C. 154(b) by 513 days.

(21) Appl. No.: 11/597,967

(22) PCT Filed: Jun. 6, 2005

(86) PCT No.: PCT/EP2005/006066
§ 371 (c)(1),
(2), (4) Date: May 12, 2009

(87) PCT Pub. No.: WO2005/119184
PCT Pub. Date: Dec. 15, 2005

(65) Prior Publication Data
US 2009/0293637 A1 Dec. 3, 2009

(30) Foreign Application Priority Data
Jun. 4, 2004 (DE) .......................... 10 2004 027 386

(51) Int. Cl.
G01F 15/00 (2006.01)
(52) U.S. Cl. .................................................... 73/861.77
(58) Field of Classification Search ............... 73/861.77, 73/861.79, 861.85, 861.91, 861.92
See application file for complete search history.

(56) References Cited

U.S. PATENT DOCUMENTS 4,294,262 A * 10/1981 Williams et al. ............. 600/539
4,389,902 A    6/1983 Kataoka et al.
6,181,036 B1   1/2001 Kazama et al.
6,487,919 B1 * 12/2002 Edwards ..................... 73/861.77
7,391,223 B2 * 6/2008 Howard et al. ............. 324/662

FOREIGN PATENT DOCUMENTS

| DE | 40 42 397 | 7/1992 |
| DE | 296 12 946 | 9/1996 |
| DE | 100 02 331 | 8/2001 |
| DE | 10 2004 027 386 | 1/2006 |
| EP | 0 053 575 | 6/1982 |
| EP | 0 393 294 | 10/1990 |
| EP | 0 741 279 | 11/1996 |
| EP | 1 058 324 | 6/2000 |
| JP | 56151315 | 11/1981 |
| JP | 58 193221 | 12/1983 |
| JP | 61213724 | 9/1986 |
| JP | 3053125 | 3/1991 |
| JP | 8285654 | 11/1996 |
| WO | 00/25371 | 4/2000 |
| WO | WO 01/63221 | 8/2001 |

OTHER PUBLICATIONS

GMR Sensors Data Book, NVE Corporation, Eden Prairie, Minnesota, Apr. 28, 2003.

* cited by examiner

Primary Examiner — Jewel Thompson
(74) Attorney, Agent, or Firm — Salter & Michaelson

(57) ABSTRACT

The invention relates to a flow sensor having a measuring chamber to which a fluid whose volume and/or rate of flow is to be measured is supplied and then drawn off. Inside the measuring chamber elements of a measuring mechanism are mounted so as to freely rotate. The sensor is also provided with a magnet which produces a magnetic field inside the measuring chamber and in close proximity thereto. At least one sensor device measures the magnetic field and/or changes in the magnetic field. The sensor device for measuring the magnetic field is provided with at least one giant magnetoresistance sensor.

23 Claims, 3 Drawing Sheets

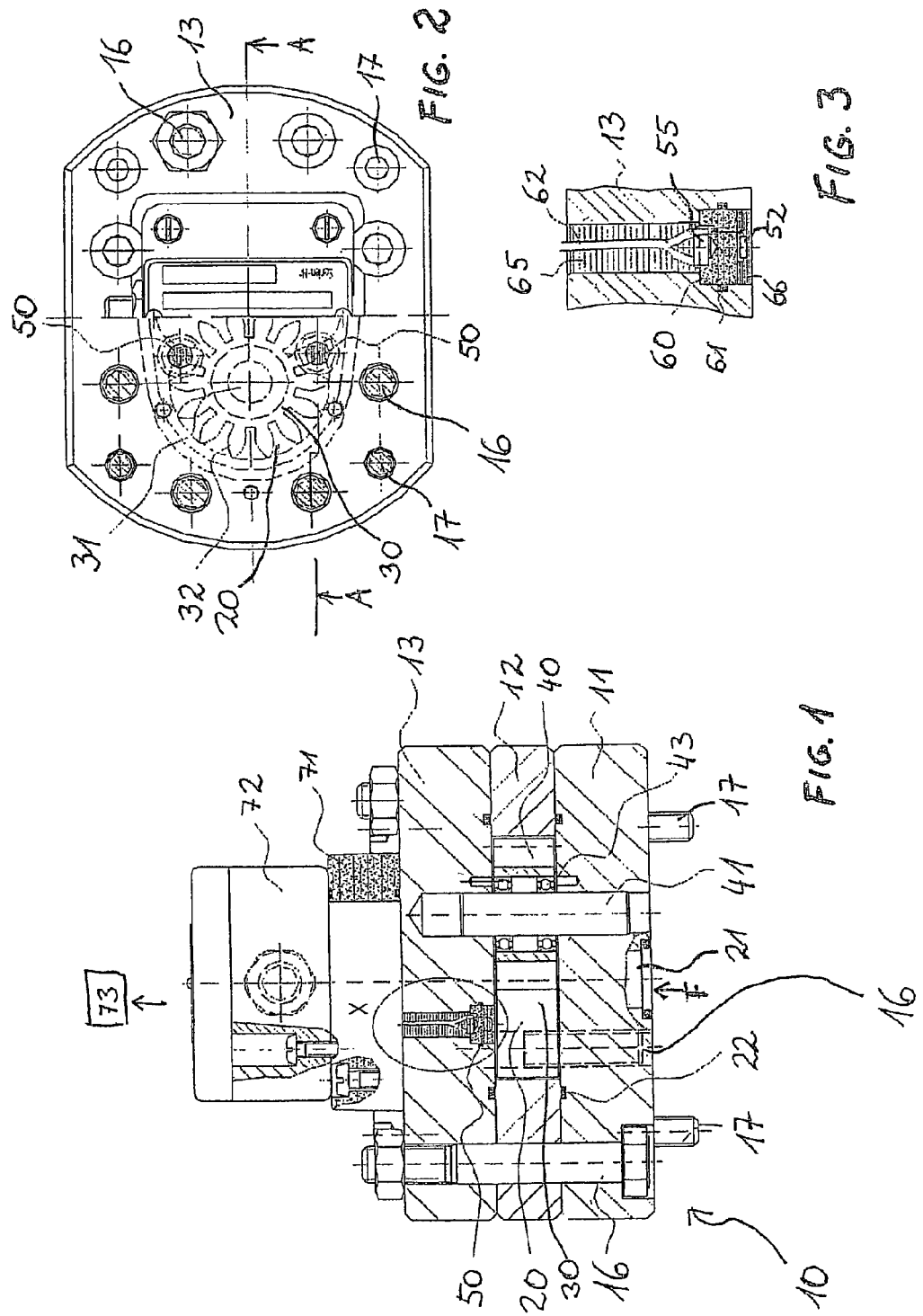

FLOW RATE SENSOR

TECHNICAL FIELD

The invention relates to a flow rate sensor having a measuring chamber, into which a fluid, the volume and/or flow rate of which is to be measured, can be fed and then discharged, having measuring mechanism elements disposed in the measuring chamber and mounted in a freely rotatable manner, having a magnet for generating a magnetic field in the measuring chamber and in the immediate vicinity thereof, and having at least one sensor device for measuring the magnetic field and/or variations of the magnetic field.

BACKGROUND OF THE INVENTION

Flow rate sensors are also known as volume sensors. Generally, they take the form of displacement meters. Examples of these are gear sensors, screw spindle meters, oval-wheel meters, cylindrical-piston meters or alternatively measuring turbines or proportioning gear pumps. They are used to measure a volume, a throughflow quantity or the rate at which a medium, here therefore a fluid, passes through the measuring instrument. The fluids may be liquids, pastes or gases.

In practice, flow rate sensors are often not measuring instruments in the narrower sense because the evaluation electronics are not part of the instrument but situated externally. Nevertheless, the term "flow rate measuring instrument" is often used and reference is also made to measuring chambers and measuring mechanism elements etc. The flow rate sensors are frequently also described as volume sensors, throughflow sensors, flow rate measuring instruments etc.

The volume sensors or flow rate sensors merely sense the flow or a volume that has flown through and transmit a signal to the evaluation unit or evaluation electronics, which only then produce a measured value therefrom. The expression "flow rate sensor" is used below. A confusion with specific structural elements in the instrument that are detectors or sensors in the narrower sense is avoided by use of the full designation.

Flow rate sensors or volume sensors in the form of gear sensors are known for example from EP 0 053 575 B1, EP 0 393 294 A1 or DE 40 42 397 C2 as well as EP 0 741 279 B1. They have a housing comprising two halves. In the one housing half, a pair of circular gear wheels are mounted in a freely rotatable manner in a measuring chamber on fixed axles by means of ball bearings and without wall contact. The two gear wheels mesh with one another. The medium, the displaced volume or flow rate of which is to be determined, is fed through a first bore to the two gear wheels, namely into the region where these gear wheels mesh with one another. The medium therefore passes into the chambers that are mutually formed in the tooth spaces of the two gear wheels. As a result of the following flow of the medium, the quantities situated in the chambers of the gear wheel are conveyed from the inlet side to the outlet side and by means of the movement of the teeth then set the gear wheels in rotation. The two gear wheels in said case rotate in opposite directions. At the other side of the gear wheels in flow direction downstream of the meshing region, the medium is discharged through a second bore.

The other housing half serves as a top cover for the region of the measuring chamber having the two gear wheels plus the medium flowing here. It therefore tightly closes the measuring chamber and prevents fluid streams from being able to pass through the measuring chamber outside of the meshing region of the gear wheels. The two housing halves lie one flat on top of the other and between them lies a, so to speak, virtual parting plane.

Permanent magnets such as for example in DE 40 42 397 C2 or carrier frequency sensors as in EP 0 741 279 B1 are provided in the housing adjacent to the meshing region of the gear wheels and build up an electromagnetic field. This field is varied by the teeth of the gear wheels and/or by the movement thereof.

The second housing half in the known arrangements mentioned above moreover accommodates a magnetoresistive differential sensor. The magnetoresistive differential sensor senses the variations of the fields caused by the movement of the teeth of the rotating gear wheels.

The sensor in these known instruments is separated from the medium or fluid to be measured by a non-magnetic insert, which protects the sensor in particular from the physical and chemical stresses imposed by the medium. The medium may not only have a very different temperature or consistency but may also be chemically aggressive.

This protection leads disadvantageously to a spacing of the sensor from the teeth of the rotating gear wheels that makes measurement more difficult and limits the accuracy and reliability of measurement. By means of suitable pole pins or other measures, the movement of each tooth flank during rotation of the associated gear wheel relative to the magnetoresistive differential sensor is then detected and communicated externally to suitable evaluation units.

Particularly with larger piece numbers of flow rate sensors, the economic aspect gains in importance. Nevertheless, even with larger piece numbers the accuracy and precision remains important. In many cases, the flow rate of a fluid is also adjusted in closed-loop control circuits depending on the measurement.

It would therefore be desirable to carry out as precise as possible a measurement of the quantity and/or rate of flow of a fluid by means of flow rate sensors that entail the least possible outlay.

The object of the invention is therefore to propose flow rate sensors that combine a particularly economical design with nevertheless accurate measurement results.

SUMMARY OF THE INVENTION

This object is achieved by flow rate sensors having a measuring chamber, into which a medium (fluid F), the volume and/or flow rate of which is to be measured, can be fed and then discharged, having measuring mechanism elements disposed in the measuring chamber and mounted in a freely rotatable manner, having a magnet for generating a magnetic field in the measuring chamber and in the immediate vicinity thereof, and having at least one sensor device for measuring the magnetic field and/or variations of the magnetic field, wherein the sensor device is disposed axially offset relative to the freely rotatably mounted measuring mechanism elements, and wherein the sensor device for measuring the magnetic field comprises at least one giant magnetoresistance sensor.

Giant magnetoresistance, mostly known as GMR effect, is a highly sensitive way of detecting magnetic fields and the changes thereof in a magnetoresistive manner. In connection with flow rate sensors, however, giant magnetoresistance has previously not yet been used.

The use of GMR sensors is known for the scanning of gear wheels in the different connection, say, from DE 296 12 946 U1. The GMR sensor from this known arrangement radially scans a tooth of a rotating gear wheel, alternatively the mutually offset teeth of a gear wheel pair disposed on the same axis. Such arrangements are however unsuitable for volume sensors because in these there always has to be two mutually meshing gear wheels mounted in a narrow housing with close tolerances. Given an arrangement of the GMR sensors as proposed, only the tooth tips are scanned, this leading to an inaccurate and asymmetrical electrical signal and hence to corresponding and accurate measurements of the flow quantities and flow rates. Furthermore, there is no room laterally alongside the gear wheels, and/or retro-fitting of the entire system in an installation is considerably impeded.

In an angular resolver according to DE 100 02 331 A1 it is proposed to carry out as precise as possible a measurement of the angle of a rotating part by means of a GMR sensor and a multi-stage gear. The gear arrangement alone prevents the use of these ideas in flow rate sensors and volume sensors.

All of the proposals to fit GMR sensors relate to conventional ambient conditions, i.e. substantially room temperature and normal pressure conditions. Comprehensive application examples in "GMR-Sensors Data Book", published by the NVE Corporation, Eden Prairie, Minn., USA in April 2003, likewise relate to normal ambient conditions, possibly with increased temperatures.

A use of GMR sensors in volume sensors has therefore not yet been considered before because, here, pressures and pressure peaks of 60 Mpa to 80 Mpa (600 to 800 bar) may arise and under these extreme loads a highly precise working method still has to be ensured. What is more, the fluids to be measured may be electrically conductive and aggressive liquids and this should not impair the serviceability of the entire flow rate sensor.

Surprisingly, by virtue of the concept according to the invention it is possible to achieve a substantial improvement of conventional flow rate sensors by using GMR sensors in a suitable form. The GMR sensors are now fitted, not radially outside of the gear wheels as for example in DE 296 12 946 U1, but axially directly alongside the gear wheels and/or comparable elements. In contrast to the background art for flow rate sensors, they may however be disposed there much closer and nearer to the interior of the measuring chamber adjacent to the teeth.

As the signals of the sensor are markedly stronger and of greater magnitude than in conventional instruments, they may be processed better and with less trouble in downstream devices, such as pre-amplifiers or evaluation devices.

It is particularly advantageous that these GMR sensors may be constructed in the form of integrated circuits (ICs).

In a preferred manner, an integrated circuit of a GMR sensor that is surface-mounted onto an electronic printed circuit board is used. The printed circuit board is then on the one hand the electrical connection of the sensor to the evaluation unit and at the same time seals off the instrument and/or the measuring chamber mechanically from the pressurized fluids, i.e. liquids or gases, situated in the interior.

As it is possible to dispose the sensor practically in the interior of the measuring chamber and/or immediately adjacent thereto, then, unlike in the background art, there is no longer any need for an additional non-magnetic shielding, which increases the spatial requirement, and the sensor may therefore be fitted very much closer in towards the region of the gear wheels, measuring spindles and the like that are to be scanned. Only the thickness of a casting compound then separates the sensor from the measuring mechanism elements that are to be measured. The thickness of this casting compound is, on the one hand, very low and, on the other hand, is to be kept very small in dependence upon the external boundary conditions.

At the same time, the printed circuit board may be used to fix and position the magnet or magnets. One or more magnets were of course also required already in the background art to build up a magnetic field. The changes of the respective magnetic field were, as already mentioned, caused by the movements of the teeth of the gear wheels across the magnetic field. These changes were then conventionally measured by the magnetoresistive differential sensor and evaluated.

A magnetic field is also required according to invention. It is established, in the present case too, by means of one or more magnets. However, whereas previously this magnet had to be disposed separately likewise in a protected manner simultaneously in the housing, according to the invention the printed circuit board, which also carries the integrated circuits, may likewise receive, fix and/or position the magnet or magnets. The magnetic field built up by the magnet or magnets is likewise varied by the teeth of the gear wheels and/or by other measuring mechanism elements in other forms of flow rate sensors. The GMR sensor however now detects a different effect, namely an influencing of the giant magnetoresistance by the changing magnetic field.

By virtue of simultaneously using the printed circuit board to fix and position the magnet or magnets, however, it is possible to dispense with additional components, thereby allowing an even simpler design of the flow rate sensor.

The printed circuit board may be externally sealed by means of an O-ring.

The printed circuit board itself has plated-through holes, into which any cables that are required may then be soldered.

This then dispenses with practically all of the structural elements that are to be additionally installed in the background art for example according to DE 40 42 397 C2, i.e. the terminal posts or the holding plate for receiving the posts as well as the no longer required non-magnetic insert. The use of the integrated circuit (IC) with the printed circuit board practically in the pressure chamber and the said procedure during installation are extremely economical. Besides the integrated circuit of the magnet and the printed circuit board, practically no further components are now required.

A further advantage arises in that the Wheatstone bridge that is advantageously used for evaluation may now be disposed entirely in the instrument, namely unified with both branches of the Wheatstone bridge. This means that the two branches lie at practically the same temperature level and so it is no longer necessary computationally to effect compensations at the measured values for differing temperatures in the two branches.

For the magnet, in a preferred manner a samarium-cobalt magnet is used because it operates independently of temperature and therefore offers advantages over magnets constructed on a neodymium base.

The invention may be used not only in gear sensors but also in other flow rate sensors and/or volume sensors, for example in screw spindle meters, oval-wheel meters, cylindrical-piston meters or alternatively in measuring turbines or in proportioning gear pumps. There, instead of the teeth of gear wheels, measurement is effected by other measuring mechanism elements behaving in an equivalent form, mostly rotating.

Giant magnetoresistance is a specific effect that arises because of a change of the electrical resistance of a multi-layered structure of ferromagnetic and non-ferromagnetic layers, which are in each case only a few nanometres thick. This change of the electrical resistance arises upon the approach of a magnetic field. Giant magnetoresistance may therefore actually be utilized in the present case in that, here, this change is measured in dependence upon the change of the magnetic field resulting from the movement of the measuring mechanism elements, i.e. for example from the movement of the teeth of a gear wheel.

The concept according to the invention leads to a high degree of sensitivity and a large measuring range.

It is i.a. also highly advantageous that by virtue of the invention a very uniform sinusoidal signal may be generated as an output signal. Uniform sinusoidal signals allow particularly reliable evaluation and moreover a more detailed analysis of the individual sub-regions of the sinusoidal signal, thereby offering further-potential applications.

It is also advantageous that the corresponding sensors for the flow rate sensors according to the invention are very practicable and economical to manufacture. The printed circuit boards are manufactured in panels and their components are automatically fitted.

The electrical connection out of the region of the measuring chamber, i.e. out of the pressure chamber, may be effected by means of soldering operations in the plated-through holes of the printed circuit board. Such a connection is extremely secure and also withstands the very high pressures and thermal loads in the region of the fluids in the measuring chamber.

In said case, it is preferred when the sensor is connected by means of a flat ribbon cable electrically to a circuit device and the flat ribbon cable is run from the sensor through a drill hole in the housing of the flow rate sensor to the circuit device.

Said circuit device is in a preferred manner a pre-amplifier. The flat ribbon cable then forms the connection from the sensor to the pre-amplifier. The pre-amplifier in turn is a component part of the instrument according to the invention and transfers the data, which it processes, externally to an evaluation unit.

DESCRIPTION OF THE DRAWINGS

An embodiment of the invention is described in detail below with reference to the drawings. The drawings show:

FIG. 1 a vertical section through a flow rate sensor according to the invention along the line direction A-A of FIG. 2;

FIG. 2 a plan view, partially broken away, of the flow rate sensor of FIG. 1;

FIG. 3 an enlarged cutout of the detail X of FIG. 1;

DETAILED DESCRIPTION

Figure 4:
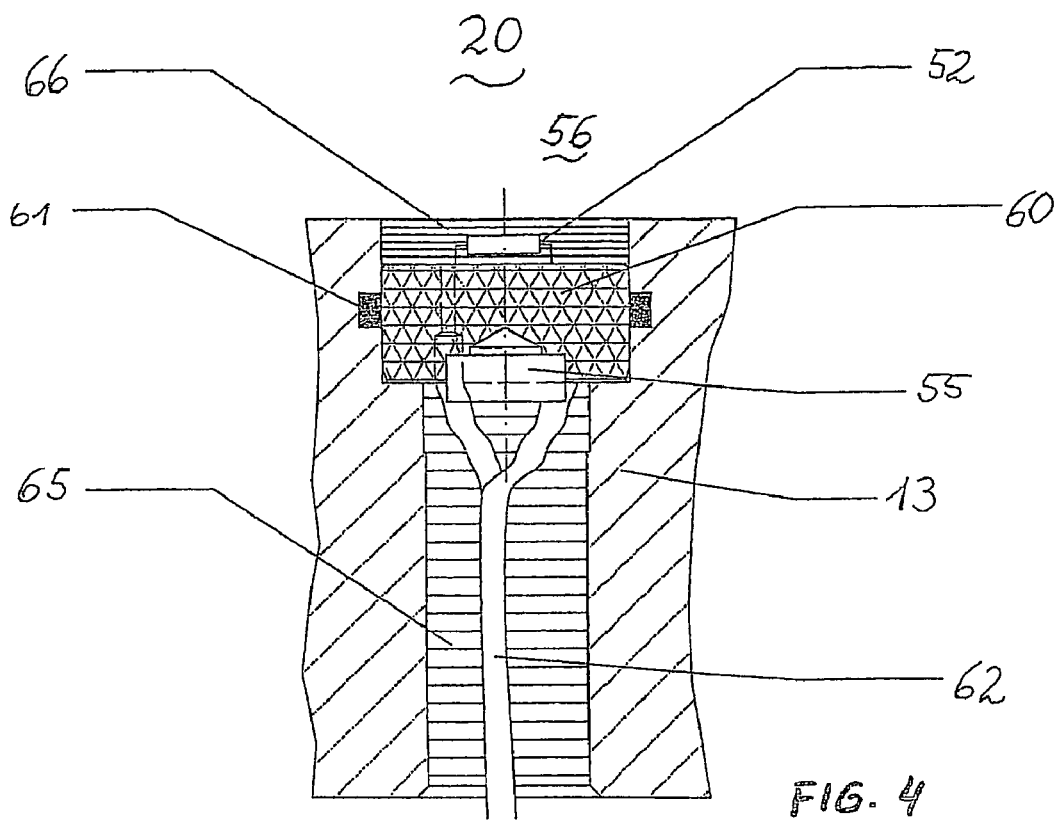
FIG. 4 a section through a sub-region of a flow rate sensor according to the invention.

FIG. 1 shows as an overview a section through a flow rate instrument according to the invention. The section does not extend in an exact plane but is offset forward and backward several times in order better to show the details of the flow rate instrument. The more exact line direction of the forward and backward offsets may be gathered from FIG. 2.

Particularly evident is a housing 10 of the flow rate sensor. The housing 10 comprises in particular three plate-like elements laid one on top of the other, namely a base plate 11, a middle piece 12 and a cover 13. In this case, the base plate 11 and the middle piece 12, taken together, are roughly comparable to the first housing half mentioned in the background art in DE 40 42 397 C2.

The base plate 11, the middle piece 12 and the cover 13 are connected to one another by fit bolts 16 as well as fastening screws 17. This connection has to be very precise, on the one hand, and very strong, on the other hand, because a measuring chamber 20 is situated in the inner region of the middle piece 12.

A short look at FIG. 2 shows the arrangement viewed, in FIG. 1, from above. At the right side, the heads of the fit bolts 16 and the fastening screws 17 may be seen. As may be seen, around the top of the cover 13 eight heads of fit bolts and four heads of fastening screws are visible in order to allow a uniform, strong and sealed tightening of these bolts and screws.

Returning to FIG. 1, this reveals that both the fastening screws 17 and the fit bolts 16 pass right through the housing 10 comprising the base plate 11, the middle piece 12 and the cover 13.

The measuring chamber 20 is formed only in the middle piece 12 and is accordingly closed below and above by the base plate 11 and the cover 13 respectively, which therefore form the end walls of the measuring chamber 20.

A connection bore 21 in the base plate 11 leads into the measuring chamber 20. Through this connection bore 21 a fluid F, i.e. the medium in question here, may be fed. A second connection bore in the base plate 11 is not visible in FIGS. 1 and 2; through this second connection bore the fluid F is then discharged after running through the measuring chamber 20.

Besides the end walls which, as already mentioned, are formed by the base plate 11 and the cover 13, the measuring chamber 20 is encircled by the walls of the middle piece 12, as is also shown in the dashed representation on the left half of FIG. 2. Furthermore, (cf. FIG. 1 again) O-rings 22 are provided for sealing the gaps between the underside and top of the middle piece 12, on the one hand, and the underside of the cover 13 and the top of the base plate 11.

Two measuring mechanism elements 30 and 40 are situated in the measuring chamber 20. In the illustrated embodiment, these are in each case gear wheels.

In said case, the first gear wheel and/or the first measuring mechanism element 30 is clearly visible from above in FIG. 2 on the left side. Situated in its centre is the axis 31, about which the gear wheel and/or first measuring mechanism element 30 may rotate freely, and a series of teeth 32 project outwards from the axis 31 of the measuring mechanism element 30.

In FIG. 1 the first measuring mechanism element 30 may be seen only diagrammatically on the left side as the line direction A of the section passes through the measuring chamber 20 only in the edge region of the first measuring mechanism element 30.

To make up for this, the second measuring mechanism element 40, here therefore the second gear wheel, is shown in full section in FIG. 1. In the section, the axis 41 and in addition two flanks of teeth 42 may be seen. Also evident are various elements of a bearing 43, which ensures the freedom to rotate of the second measuring mechanism element 40 too.

Both measuring mechanism elements 30, 40 are made of a ferromagnetic material, by means of which magnetic fields may be markedly influenced when the measuring mechanism elements 30, 40 rotate about the axes 31, 41.

As may be seen, the two measuring mechanism elements 30, 40 mesh with one another and the fluid F fed through the connection bore 21 gives rise to a rotation of the two measuring mechanism elements 30, 40 in opposite directions.

A sensor device 50 is represented relatively small in FIG. 1. From FIG. 2 it is evident that in the concrete embodiment two sensor devices 50 of similar design are provided. Both are situated above the measuring chamber 20 in a region, below and across which the teeth 32 of the first measuring mechanism element 30 rotate. Because of the ferromagnetic properties of the first measuring mechanism element 30, a magnetic field 56 situated below the sensor device 50 is influenced and changes. Details of this are additionally indicated below.

One of the two sensor devices 50 is shown to a slightly enlarged scale in FIG. 3. FIG. 3 therefore shows a sub-region of the cover 13 above the measuring chamber 20. Cut out in the cover 13 is a channel, in which the sensor device 50 is fitted.

Central element of the sensor device 50 is a magnet 55, here a round magnet. It builds up the magnetic field 56 that is varied by the ferromagnetic properties of the measuring mechanism element 30.

The changes of the magnetic field are picked up and acquired by a sensor 52 that operates on the basis of the physical effect of giant magnetoresistance. This sensor 52 is disposed almost directly above the bottom edge of the cover 13 and therefore lies almost without clearance above the measuring chamber 20, in which the first measuring mechanism element 30 rotates. The changes of the magnetic field 56 therefore occur practically immediately next to the sensor 52 and may be picked up in a highly precise and exact manner.

The sensor 52 and the magnet 55 are both disposed on a printed circuit board 60 and connected thereto. Also situated on this printed circuit board 60 is an integrated circuit (not shown). The printed circuit board is simultaneously a pressure plate. It is sealed on all sides inside the cover 13 by an O-ring 61 because in the measuring chamber 20 situated immediately below the sensor 52, as already mentioned, there are fluids that may have very high temperatures. There, moreover, a high pressure may prevail and the fluids F may be chemically or physically aggressive. The pressure plate property of the printed circuit board 60 together with the sealing by the O-ring 61 prevents the fluid F from penetrating into the cover 13 behind the printed circuit board 60, viewed in FIG. 3 or in an upward direction in FIG. 1.

An electrical connection of the printed circuit board 60, the magnet 55 and the sensor 52 having the GMR-measuring properties is effected by means of a flat ribbon cable 62, which is not diagrammatically represented here.

The region around the flat ribbon cable 62 is filled by a casting compound 65 in order to keep the cable completely stable and prevent the penetration of foreign bodies from outside of the housing into this region.

A second casting compound 66 entirely fills the region between the printed circuit board 60 having the pressure plate properties and the measuring chamber 20 and therefore completely embeds the sensor 52. Here, a smooth surface is desired in order to rule out any flow behaviour of the fluid F that might interfere with the measurement.

From FIG. 1 it is evident that the connection by means of the flat ribbon cable 62 leads into an intermediate plate 71, through which there is a connection to a pre-amplifier 72 and, from there, out of the flow rate sensor to an evaluation unit 73. These are represented here purely diagrammatically. They may optionally be exchanged and adapted to the concrete external conditions of the flow rate sensor.

The magnet 55, in a preferred form of construction a samarium-cobalt magnet, generates the magnetic field 56. This magnetic field 56 extends into the measuring chamber 20 and the surrounding regions adjacent thereto. The magnetic field 56 penetrates in particular the sensor 52, which here according to the invention is a GMR sensor. As a result of the rotation, the magnetic field 56 is perturbed by the adjacent tooth 32 running past just below the magnet 55 and the sensor 52 and by the associated tooth space of the gear wheel 30. This varying magnetic field 56 generates in the GMR sensor 52 an electrical signal, which in the switching device, thus here the pre-amplifier 72, is amplified and digitized. The digital signal is then transmitted via a further cable (not shown) to the evaluation electronics outside of the flow rate sensor and is evaluated there.

In FIG. 4 the illustration of FIG. 3 is repeated once more in a similar form. Here, for illustrative reasons, the view has practically been turned upside down so that the measuring chamber 20 of the flow rate sensor in the housing 10 is situated at the top. Also indicated there is that in this region the magnetic field 56 that is regularly changed by the movement of the teeth 32 (not shown) of the first measuring mechanism element 30 is situated. Here, it should moreover be taken into consideration that, should the measuring mechanism element not be a gear wheel, other elements instead of teeth are conceivable.

The magnet 55 and the sensor 52, which utilizes the giant magneto-resistance effect, are illustrated once more to an enlarged scale.

The magnet 55 and the further elements are electrically connected by a flat ribbon cable 62, running in a downward direction in the illustration in FIG. 4, to the intermediate plate 71 and the further elements described in connection with FIG. 3.

Figure 5:
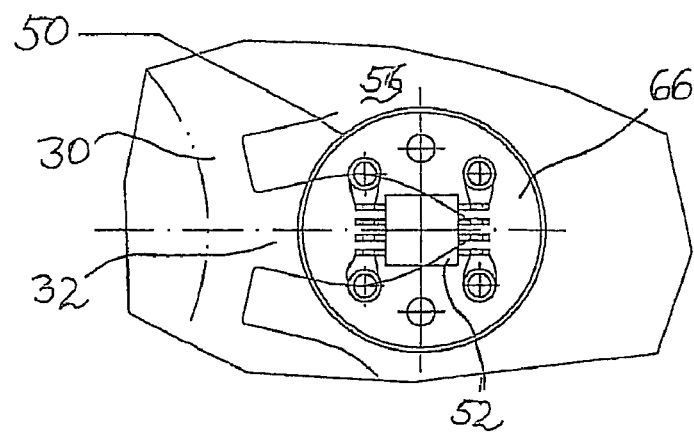
FIG. 5 a plan view of the sub-region of FIG. 1.

FIG. 5 once more shows the view of FIG. 4, namely in this case viewed from above. The view is therefore onto the casting compound 66. Additionally indicated is a tooth 32 of the measuring mechanism element 30 that is situated precisely below the sensor device 50, i.e. is situated in a movement, in which it sweeps past this region.

Notionally in the illustration the casting compound 66 is transparent, which in practice naturally need not be the case. It is therefore possible in the present case to see the sensor 52 through the casting compound 66, and moreover run connections so that the printed circuit board 60 is partially visible.

Figure 6:
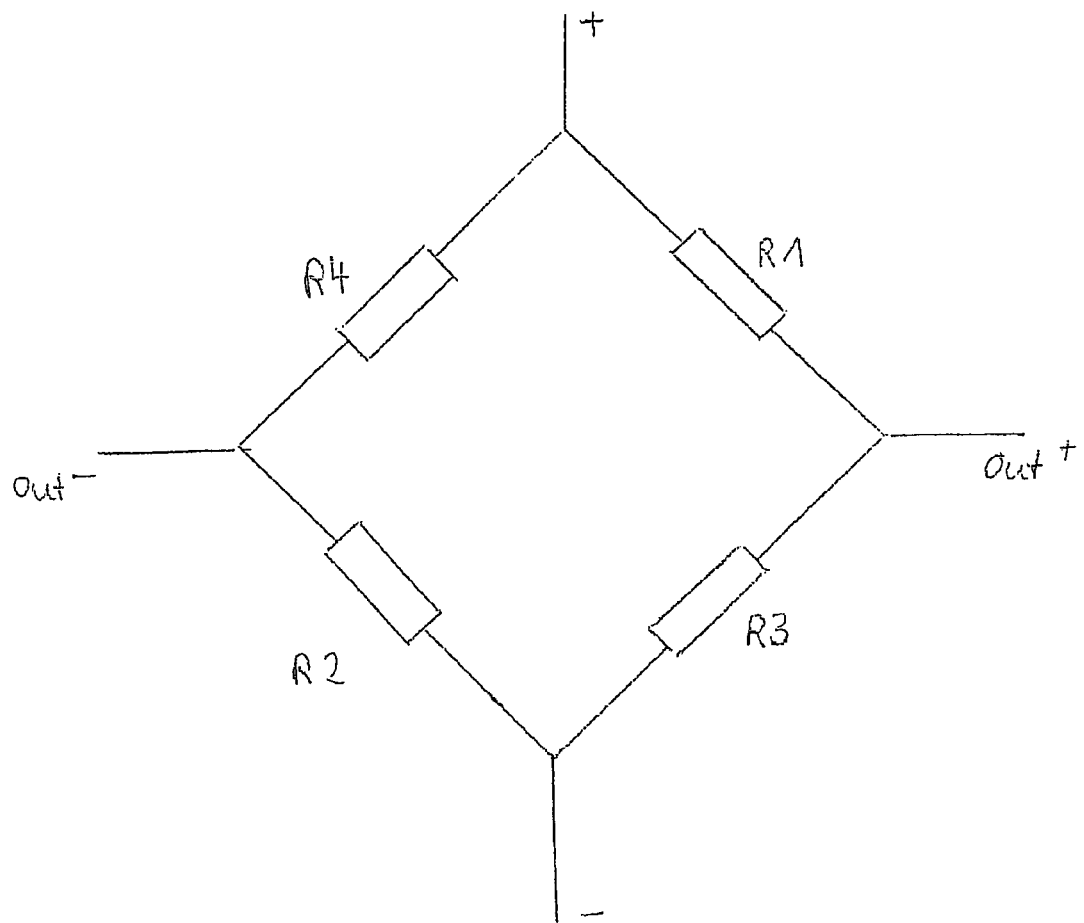
FIG. 6 a diagrammatic representation of a Wheatstone bridge used in accordance with the invention.

FIG. 6 is a diagrammatic representation of the structure of a Wheatstone bridge, which as part of the integrated circuit on the printed circuit board 60 includes the GMR sensor 52.

What may be seen is the conventional circuit of a Wheatstone bride having four resistors, of which three are known and the fourth is correspondingly influenced by the magnetic field 56.

REFERENCE CHARACTERS 10 housing
11 base plate
12 middle piece
13 cover
16 fit bolts
17 fastening screws
20 measuring chamber
21 connection bore
22 O-rings for the measuring chamber
30 first measuring mechanism element, in particular first gear wheel
31 axis of first measuring mechanism element 30
32 tooth of first measuring mechanism element 30
40 second measuring mechanism element, in particular second gear wheel
41 axis of second measuring mechanism element 40
42 tooth of second measuring mechanism element 40
43 bearing arrangement of second measuring mechanism element 40
50 sensor device
52 sensor
55 magnet
56 magnetic field 60 printed circuit board
61 O-ring
62 flat ribbon cable
65 first casting compound
66 second casting compound
71 intermediate plate
72 pre-amplifier
73 evaluation unit
F fluid

The invention claimed is:

1. Flow rate sensor including a measuring chamber, into which a medium, the volume and/or flow rate of which is to be measured, can be fed and then discharged, said flow rate sensor comprising:
   including measuring mechanism elements disposed in the measuring chamber and mounted in a freely rotatable manner,
   a magnet for generating a magnetic field in the measuring chamber and in the immediate vicinity thereof,
   at least one sensor device for measuring the magnetic field and/or variations of the magnetic field,
   wherein the sensor device is disposed axially offset relative to the freely rotatably mounted measuring mechanism elements,
   wherein the sensor device for measuring the magnetic field comprises at least one magnetoresistance sensor,
   wherein the sensor device includes a circuit board which carries the at least one sensor, and
   wherein circuit board carries the magnet.

2. Flow rate sensor according to claim 1, wherein the circuit board comprises a printed circuit board, which is configured as a pressure plate, and the sensor device is mounted at one side of the pressure plate and the magnet is mounted at an opposite side of pressure plate.

3. Flow rate sensor according to claim 2, wherein the measuring mechanism elements comprise a pair of intermeshing gears the sensor device comprises a pair of spacedly disposed sensors that are constructed and arranged relative to only one of the gears.

4. Flow rate sensor including a measuring chamber, into which a medium, the volume and/or flow rate of which is to be measured, can be fed and then discharged, said flow rate sensor comprising:
   measuring mechanism elements disposed in the measuring chamber and mounted in a freely rotatable manner,
   a magnet for generating a magnetic field in the measuring chamber and in the immediate vicinity thereof,
   at least one sensor device for measuring the magnetic field and/or variations of the magnetic field,
   wherein the sensor device is disposed axially offset relative to the freely rotatably mounted measuring mechanism elements,
   wherein the sensor device for measuring the magnetic field comprises at least one magnetoresistance sensor,
   wherein the sensor is connected by means of a flat ribbon cable electrically to a circuit device, and
   that the flat ribbon cable is run from the sensor through a housing of the flow rate sensor to the circuit device.

5. Flow rate sensor according to claim 2, wherein the printed circuit board is disposed immediately adjacent to the measuring chamber and is separated from the measuring chamber only by a casting compound.

6. Flow rate sensor according to claim 5, wherein the magnet is a samarium-cobalt magnet.

7. Flow rate sensor according to claim 2, wherein the sensor is connected by means of a flat ribbon cable electrically to a circuit device, and
   that the flat ribbon cable is run from the sensor through a drill hole in the housing of the flow rate sensor to the circuit device.

8. Flow rate sensor according to claim 3, wherein the sensor is connected by means of a flat ribbon cable electrically to a circuit device, and
   that the flat ribbon cable is run from the sensor through a drill hole in the housing of the flow rate sensor to the circuit device.

9. Flow rate sensor according to claim 3, wherein the printed circuit board is disposed immediately adjacent to the measuring chamber and is separated from the measuring chamber only by a casting compound.

10. Flow rate sensor according to claim 4, wherein the printed circuit board is disposed immediately adjacent to the measuring chamber and is separated from the measuring chamber only by a casting compound,
    that the flat ribbon cable is run from the sensor through a drill hole in the housing of the flow rate sensor to the circuit device.

11. Flow rate sensor according to claim 1, wherein the magnet is a samarium-cobalt magnet.

12. Flow rate sensor according to claim 2, wherein the magnet is a samarium-cobalt magnet 13. Flow rate sensor according to claim 3, wherein the magnet is a samarium-cobalt magnet 14. Flow rate sensor according to claim 4, wherein the magnet is a samarium-cobalt magnet.

15. Flow rate sensor according to claim 1,
    wherein the sensor is connected by means of a flat ribbon cable electrically to a circuit device, and
    that the flat ribbon cable is run from the sensor through a drill hole in the housing of the flow rate sensor to the circuit device;
    wherein the printed circuit board is disposed immediately adjacent to the measuring chamber and is separated from the measuring chamber only by a casting compound; and
    wherein the magnet is a samarium-cobalt magnet.

16. Flow rate sensor according to claim 1, wherein the sensor device comprises a pair of spacedly disposed sensors.

17. Flow rate sensor according to claim 16, wherein the measuring elements comprise a pair of engaged measurement elements each having an axis of rotation.

18. Flow rate sensor according to claim 17, wherein each sensor device is disposed axially offset relative to the freely rotatably mounted measuring mechanism elements.

19. Flow rate sensor according to claim 18, wherein the measuring mechanism elements comprise a pair of intermeshing gears and the pair of spacedly disposed sensors that are constructed and arranged relative to only one of the gears.

20. Flow rate sensor including a measuring chamber, into which a medium the volume and/or flow rate of which is to be measured, can be fed and then discharged, said flow rate sensor comprising:
    a pair of measuring mechanism elements disposed in the measuring chamber and each mounted in a freely rotatable manner about respective rotation axes;
    a magnet for generating a magnetic field in the measuring chamber and in the immediate vicinity thereof;
    a pair of spacedly disposed sensor devices for measuring the magnetic field and/or variations of the magnetic field;
    wherein both of the sensor devices are disposed axially offset relative to the rotation axes of only one of the freely rotatably mounted measuring mechanism elements; and
    wherein each sensor device for measuring the magnetic field comprises at least one magnetoresistance sensor.

21. Flow rate sensor according to claim 20, wherein the measuring mechanism elements comprise a pair of intermeshing gears, and the spacedly disposed sensor devices are arranged circumferentially about one of the intermeshing gears.

22. Flow rate sensor according to claim 20, including a circuit board which carries the pair of sensor devices, and wherein the circuit board also carries the magnet.

23. Flow rate sensor according to claim 22, wherein the circuit board is configured as a pressure plate and the sensor device is mounted at one side of the pressure plate and the magnet is mounted at an opposite side of the pressure plate.

* * * * *